No. 699,034. Patented Apr. 29, 1902.
A. P. SULLIVAN & E. S. BACON.
WAREHOUSE TRUCK.
(Application filed July 5, 1901.)
(No Model.)
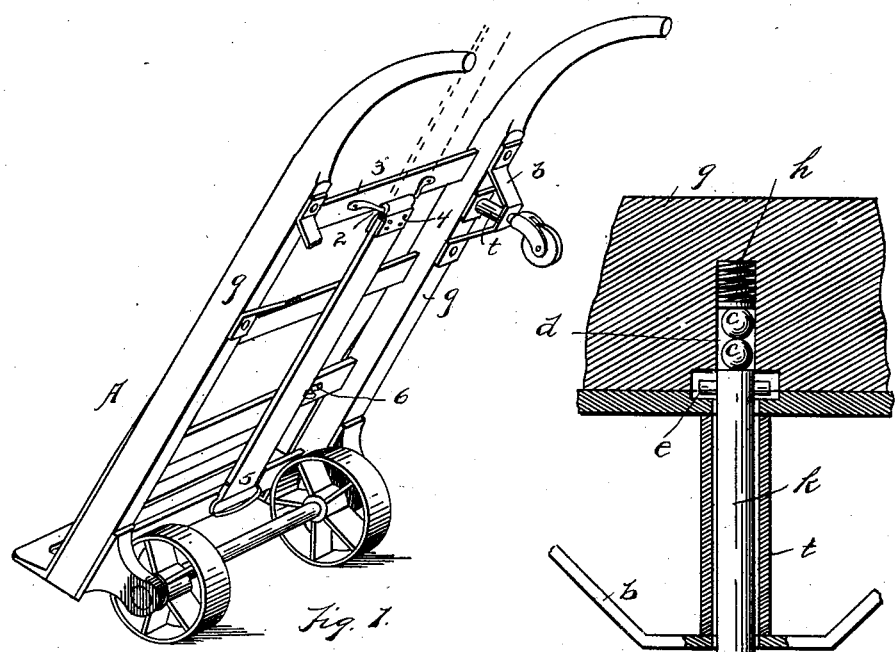
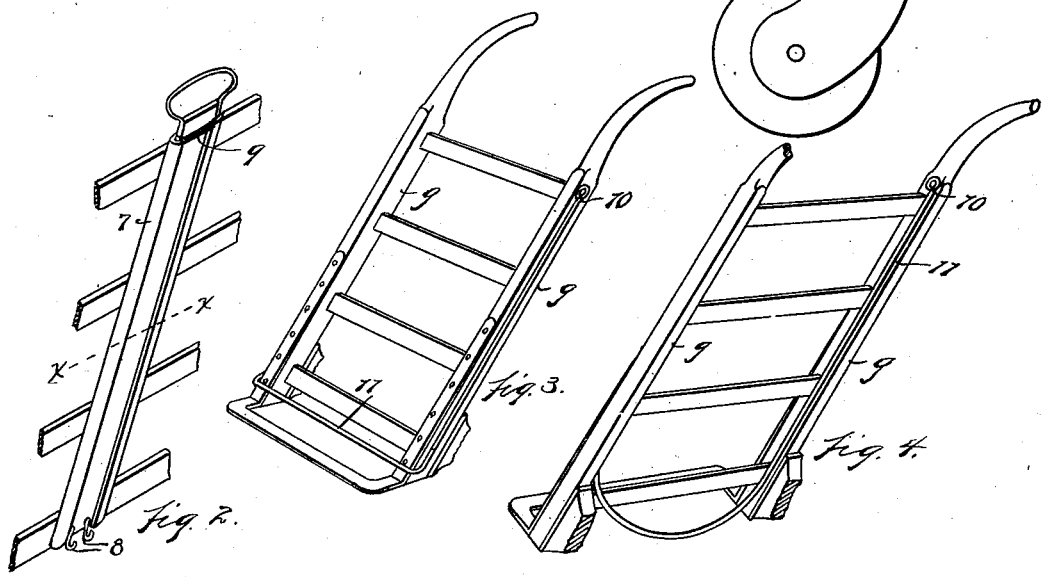
WITNESSES
Chas. E. Wiener
May E. Kott
INVENTORS,
Albert P. Sullivan
Ebenezer S. Bacon
By Parker & Burton
Attorneys.

UNITED STATES PATENT OFFICE.

ALBERT P. SULLIVAN AND EBENEZER S. BACON, OF DETROIT, MICHIGAN; SAID BACON ASSIGNOR TO SAID SULLIVAN.

WAREHOUSE-TRUCK.

SPECIFICATION forming part of Letters Patent No. 699,034, dated April 29, 1902.

Application filed July 5, 1901. Serial No. 67,117. (No model.)

*To all whom it may concern:*

Be it known that we, ALBERT P. SULLIVAN and EBENEZER S. BACON, citizens of the United States, residing at Detroit, county of Wayne, State of Michigan, have invented a certain new and useful Improvement in Warehouse-Trucks; and we declare the following to be a full, clear, and exact description of the invention, such as will enable others skilled in the art to which it pertains to make and use the same, reference being had to the accompanying drawings, which form a part of this specification.

This invention relates to warehouse-trucks, and has for its object an improved attachment to a warehouse-truck by means of which the truck can be converted from the ordinary two-wheeled truck with handles to a four-wheeled truck provided with a tongue.

In the drawings, Figure 1 is a perspective of a truck having our attachment connected therewith. Fig. 2 is a view of the bottom of the truck, showing another form of attaching the tongue-piece thereto. Figs. 3 and 4 show still other ways of attaching a tongue-piece to the truck. Fig. 5 is a detail of the caster-foot near the handle end of the truck. Fig. 6 is a cross-section at $x\ x$ of Fig. 2.

A represents a truck-frame with wheels attached thereto in the ordinary way, the axle of the wheels being journaled in fixed hangers. In place of the footpieces or rests $b$ we use casters which swivel through braces $b$. Each caster is provided with friction bearing-balls $c$, that are inserted in a cavity $d$ in the frame-piece $g$, and behind the rearmost or uppermost ball is a spring $h$. The stem $k$ of the caster is held in a bearing-tube $t$ and at its upper end is provided with means to prevent its escape from the tube or from the brace $b$. The means shown in the drawings is a pin $e$, which passes through the stem of the caster. Provision is made for a slight vertical movement of the caster-stem $k$ in the tube. The spring $h$ is placed above or behind the end of the caster-stem to cushion any blow on the caster-wheel itself caused by dropping the handle end of the truck from an elevated position to the floor, and its main use is to protect the caster from such blows.

To the truck-frame is attached a handle, tongue, or bail arranged to be utilized for draft purposes when it is desired to so use it and to be folded out of the way when it is desired to use the truck in the ordinary way as a two-wheeled truck and not as a four-wheeled one. As shown in Fig. 1, this handle is hinged at 2 to the cross-bar 3, the pin of the hinge passing through straps 4, which are folded to the end of the handle, and is itself bolted to the cross-bar 3 by bolts which pass through its projecting ends. The end 5 of the handle is provided with a ring, and a catch 6 is provided under the truck to catch and hold the handle when it is folded in the position shown in Fig. 1.

As shown in Fig. 2, the handle is similar in shape to the handle of Fig. 1; but instead of being hinged it slides in a grooved holder 7, that is secured to the under side of the truck-frame. Hooks 8 at the inner end of the handle engage with a bar 9, that crosses near the outer end and prevents the handle from being drawn out from the slides, but allows it to be drawn out sufficiently to be utilized as a tongue.

In the forms shown in Figs. 3 and 4 the handle is a bail, which in Fig. 3 is hinged to a pin 10, and a corresponding pin on the opposite side of the truck-frame and swings forward over the upper side of the truck-frame, the cross-bar 11 being arranged to cross the frame near the forward end of the side bars $g$.

In the form shown in Fig. 4 a bail of similar shape is hinged to the insides of the side bars of the truck and arranged to swing under the truck-frame.

What we claim is—

1. In combination with a truck-frame, truck-wheels having their axle mounted in fixed bearings, an independently-swiveled caster-wheel on each side bar near the handle end thereof, and a draft appliance secured to the frame at the caster-wheel end thereof and arranged to be folded to allow the truck to be used as a two-wheeled truck, and to be extended to allow the truck to be used as a four-wheeled truck, substantially as described.

2. In combination with a truck-frame, truck-wheels journaled to axles near the front end thereof, cushioned caster-wheels independently mounted in frames near the handle end thereof, a draft appliance foldably secured to the handle end of said frame, and arranged to be extended and used for draft purposes with the truck resting on four wheels, substantially as described.

In testimony whereof we sign this specification in the presence of two witnesses.

ALBERT P. SULLIVAN.
EBENEZER S. BACON.

Witnesses:
CHARLES F. BURTON.
MAY E. KOTT.